United States Patent
Yu et al.

(10) Patent No.: US 7,623,597 B2
(45) Date of Patent: Nov. 24, 2009

(54) BLOCK CODEWORD DECODER WITH CONFIDENCE INDICATOR

(75) Inventors: Xiaoyong Yu, Grayslake, IL (US); Xiangyang Chen, Vernon Hills, IL (US); Jian J. Wu, Berkshire (GB)

(73) Assignee: Motorola, Inc., Schaumburg, IL (US)

( * ) Notice: Subject to any disclaimer, the term of this patent is extended or adjusted under 35 U.S.C. 154(b) by 646 days.

(21) Appl. No.: 11/467,681

(22) Filed: Aug. 28, 2006

(65) Prior Publication Data
US 2008/0049877 A1 Feb. 28, 2008

(51) Int. Cl.
*H04L 27/06* (2006.01)
(52) U.S. Cl. .................. 375/340; 375/262; 375/341; 375/342; 375/261
(58) Field of Classification Search .............. 375/340, 375/262, 341, 261, 342; 704/242; 714/795, 714/786, 794
See application file for complete search history.

(56) References Cited

U.S. PATENT DOCUMENTS

| | | | | |
|---|---|---|---|---|
| 5,802,116 A * | 9/1998 | Baker et al. | ............... | 375/341 |
| 6,807,239 B2 * | 10/2004 | Sugimoto et al. | ........... | 375/341 |
| 6,882,690 B1 * | 4/2005 | Berggren et al. | ............ | 375/265 |
| 6,912,257 B1 * | 6/2005 | Lee et al. | .................... | 375/340 |
| 6,999,531 B2 * | 2/2006 | Jin | .............................. | 375/341 |
| 2004/0110473 A1 | 6/2004 | Rudolf et al. | | |
| 2005/0135262 A1 | 6/2005 | Pfister | | |
| 2005/0235190 A1 | 10/2005 | Miyazaki et al. | | |
| 2006/0023650 A1 | 2/2006 | Dominique et al. | | |
| 2006/0077890 A1 | 4/2006 | Suryavanshi et al. | | |
| 2006/0133291 A1 | 6/2006 | Kim et al. | | |

* cited by examiner

*Primary Examiner*—Shuwang Liu
*Assistant Examiner*—Helene Tayong

(57) ABSTRACT

A wireless transceiver (100) that produces soft decisions for received, block error correction encoded codewords and a confidence indicator signifying a likelihood of errors in the detected data. The wireless transceiver (100) processes block encrypted signals, such as feedback channel messages in a WiMax uplink. Upon receiving a signal, a soft decision is determined for received block encoded codewords. A difference is calculated between a soft decision metric for a most likely detected codeword and a soft decision metric for a next most likely detected codeword. This difference is normalized based upon the total decoder input power received over the received signal (201). The normalized difference is then scaled by a channel dependent factor and is time filtered. The normalized and time filtered confidence indicator output (212) is able to be provided to a wireless network controller to assess the usability of the received data.

16 Claims, 3 Drawing Sheets

BLOCK CODEWORD DECODER WITH CONFIDENCE INDICATOR

CROSS-REFERENCE TO RELATED APPLICATION

Not Applicable

FIELD OF THE INVENTION

The present invention generally relates to the field of data communications, and more particularly relates to estimating detected data message accuracy for decoded forward error-correction encoded data blocks.

BACKGROUND OF THE INVENTION

Wireless data communications standards sometimes incorporate feedback channels from a mobile device to a base station. As an example, the IEEE 802.16 standards, i.e., the "WiMax" standards, specify four uplink (from the mobile devices to the base station) feedback channels. These four uplink feedback channels are (1) ACK, (2) Fast Feedback, (3) Enhanced Fast Feedback and (4) Primary and Secondary Fast Feedback channels. These feedback channels are used to facilitate the base station's processing to schedule a variety of physical layer functions and perform various radio resource management processing, such as Hybrid Automatic Repeat Requests (HARQ), downlink measurements, Multiple In Multiple Out (MIMO) and Modulation Code Scheme (MCS) selection. These feedback channel messages are communicated with forward error correction coding, but do not include an error checking capability to determine if the message has been correctly detected.

In order to provide more effective radio resource management, it is desirable to not use unreliable decoded feedback messages within the scheduler. The lack of an error checking capability for these feedback channel messages limits the ability to determine and thereby exclude from scheduling processing any unreliable decoded feedback channel messages. Simulation results indicate that using a simple soft decision metric for the detected message yields varying results based upon the different air interface channels available for WiMax feedback channel communications.

Therefore a need exists to overcome the problems with the prior art as discussed above.

SUMMARY OF THE INVENTION

Briefly, in accordance with one aspect of the present invention a method for processing a received signal includes determining a first soft decision metric associated with a most likely decoded data element based upon a received undetected signal and determining a second soft decision metric associated with a next most likely decoded data element based upon the received undetected signal. The method also includes calculating a difference between the first soft decision metric and the second soft decision metric and normalizing the difference based upon a magnitude of the received undetected signal and the difference between the first soft decision metric and the second soft decision metric to produce a normalized difference. The method further includes producing the normalized difference as a decoded data element confidence indicator In accordance with another aspect of the present invention, a wireless communications digital data receiver or a base station receiver includes a soft decision processor that determines a first soft decision metric associated with a most likely decoded data element based upon a received undetected signal and a second soft decision metric associated with a next most likely decoded data element based upon the received undetected signal. The wireless communications digital data receiver or the base station receiver further has a confidence indicator calculator adapted to calculate a difference between the first soft decision metric and the second soft decision metric. The confidence indicator further normalizes the difference based upon a magnitude of the received undetected signal and the difference between the first soft decision metric and the second soft decision metric to produce a normalized difference. The wireless communications digital data receiver or a WiMax receiver also has a confidence indicator output that produces the normalized difference as a decoded data element confidence indicator.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
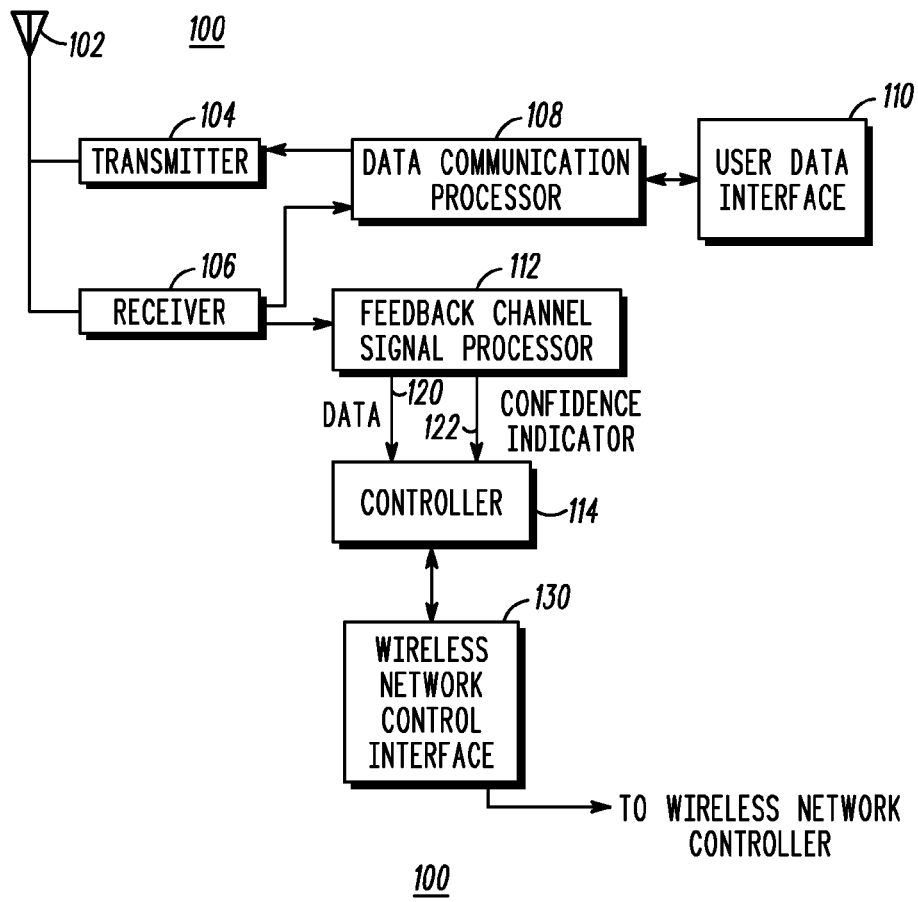
FIG. 1 illustrates a block diagram of a transceiver, in accordance with one embodiment of the present invention.

FIG. 1 illustrates a block diagram of a transceiver 100, in accordance with one embodiment of the present invention.

The illustrated transceiver 100 is an example of a transceiver, which incorporates both transmitter and receiver functionality, that incorporates aspects of the present invention. In this example, the transceiver 100 is incorporated into a wireless broadband and 3G+ base station system transceiver, such as a WiMax transceiver, and is used to process communications signals communicated between mobile devices and the base station containing the transceiver 100. The communications processed by transceiver 100 include user data communications as well as feedback channels that are used to communicate messages from mobile devices to the base station in order to support maintenance of the wireless network containing those mobile devices and this base station system transceiver.

Transceiver 100 includes an antenna 102 that is connected to a transmitter 104 and a receiver 106. The transmitter 104 and receiver 106 both exchange user data with a data communications processor 108. The data communications processor 108 performs processing required to prepare user data received through a user data interface 110 for transmission and to provide received user data produced by receiver 106 out through the user data interface 110. One embodiment of the present invention performs conventional processing to perform user data communications.

The receiver 106 of this example provides a received signal to a feedback channel signal processor 112. The feedback channel signal processor 112 of one embodiment is part of a WiMax base station receiver and processes feedback channel signals to provide received feedback channel data 120, along with a confidence indicator 122 for the received feedback channel data, to a controller 114. The controller 114 of one embodiment controls the operation of the transceiver 100 and further provides information to an external wireless network controller through a wireless network controller interface 130. Information provided to the wireless network controller includes information relating to the reliability of the detected feedback channel data received from mobile devices. The wireless network controller uses information concerning the reliability of the detected feedback channel data to support more effective allocation of RF resources. An example of information describing the detection reliability of signals received from mobile devices includes, among other things, providing an accompanying confidence indicator with feedback channel messages received from mobile devices, where the confidence indicator indicates the likelihood of data bit errors in the feedback channel message.

Figure 2:
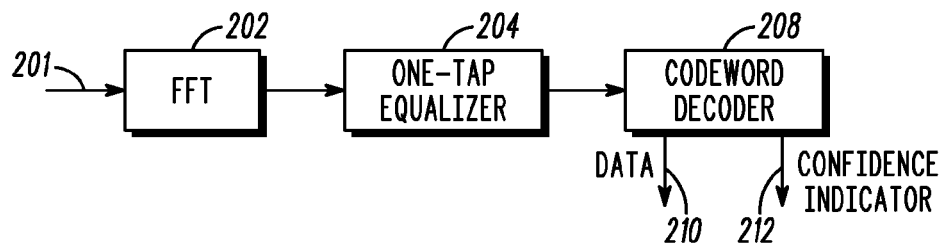
FIG. 2 illustrates a feedback channel signal processor as included in the transceiver block diagram of FIG. 1, in accordance with one embodiment of the present invention.

FIG. 2 illustrates a feedback channel signal processor 112 as included in the transceiver 100 of FIG. 1, in accordance with one embodiment of the present invention. The feedback channel signal processor 112 performs processing of a conditioned received signal representation 201 produced by receiver 106 to produce the feedback channel data output 210 and a feedback channel data confidence indicator output 212. The received signal representation 201 of this example is a down converted and conditioned signal that corresponds to a received RF signal containing feedback channel data. Further embodiments of the present invention are able to accept either a conditioned RF signal or any other suitable type of received signal representation upon which soft data decisions may be determined.

The feedback channel signal processor 112 processes a received signal representation 201 by performing a Fast Fourier Transform (FFT) 202 of that received signal. The output of the FFT processor 202 is further conditioned by a one-tap equalizer 204 to compensate for over-the-air communications channel characteristics that distort the received digital communications signal. The conditioned received signal produced by the one-tap equalizer 204 is provided to a block codeword decoder 208, which can operate with either symbol level soft decision processing or bit level soft decision processing to produce the feedback channel data output 210 and a feedback channel data confidence indicator 212, as is described below.

Figure 3:
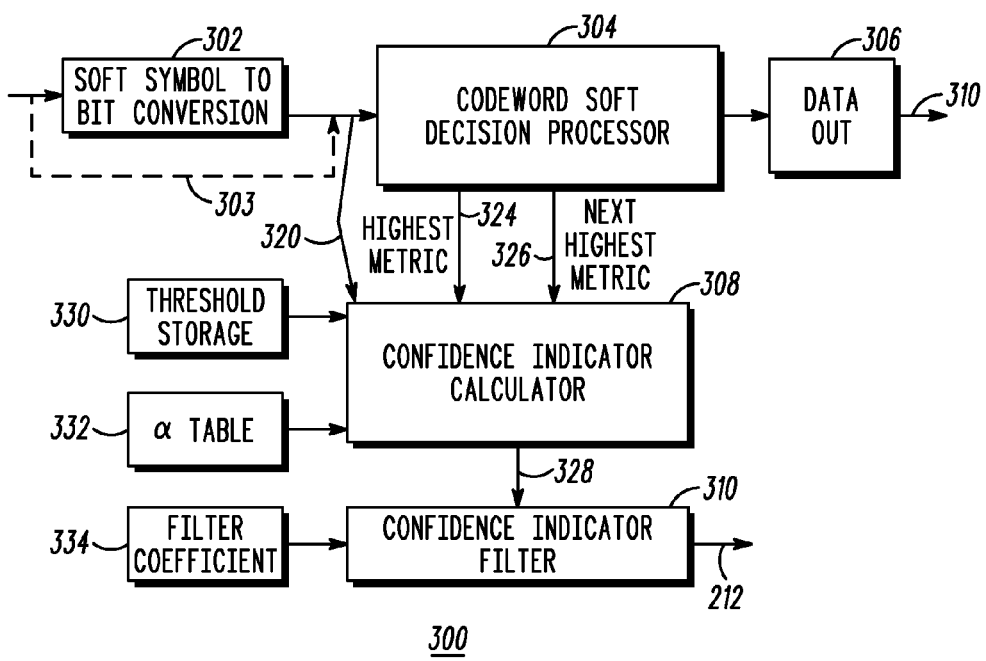
FIG. 3 illustrates a block codeword decoder as included in the feedback channel signal processor of FIG. 2, in accordance with one embodiment of the present invention.

FIG. 3 illustrates a block codeword decoder 208 as included in the feedback channel signal processor 112 of FIG. 2, in accordance with one embodiment of the present invention. Various embodiments of the present invention include a block codeword decoder 208 that performs either bit level soft decision decoding or symbol level soft decision decoding in their processing to detect transmitted block encoded data. Embodiments that perform bit level soft decision processing include a soft symbol to bit conversion processor 302. In those embodiments, an input from the one tap equalizer 204 is processed to determine soft decisions for each detected received bit. Further embodiments of the present invention perform symbol level soft decision processing and determine soft decisions based on the entire received block encoded codeword. Embodiments that perform symbol level decoding provide the input signal from the one-tap equalizer 204 directly to the codeword soft decision processor 304 through input connection 303. The soft symbol to bit conversion 302, which is included in embodiments that perform bit level soft decision processing, translates soft symbols from the one-tap equalizer 204 into soft bit decisions that are used by subsequent processing. The soft data bit decisions produced by the soft symbol to bit conversion 302 are provided to a codeword soft decision processor 304.

The soft data bit decisions produced by the soft symbol to bit conversion 302 of embodiments that perform bit level soft decision processing contain block encoded feedback channel data messages. As an example, an Enhanced Fast Feedback (EFF) channel data message contains 6 feedback message data bits. Each of these six bit messages is block encoded into a 96 bit block encoded codeword that is communicated though the use of 48 QPSK channel symbols. In embodiments that perform bit level soft decision processing, the codeword soft decision processor 304 processes these 96 soft data bit decisions to determine a soft decision for entire block encoded codeword along with soft decision metrics for both the most likely and the next most likely soft decision data estimates.

In embodiments that perform symbol level soft decision processing, the codeword soft decision processor 304, which processes the received undetected signal produced by the one-tap equalizer 204, processes the 48 QPSK channel symbols of the above EFF example to determine a soft decision for entire block encoded codeword along with a soft decision metric for both the most likely and the next most likely soft decision data estimates. Further embodiments of the present invention operate to process soft decisions to determine soft decision metrics for the most likely and the next most likely estimated codeword by using any suitable technique. As is known to ordinary practitioners in the relevant arts, soft decisions for a codeword have an associated soft decision metric. Soft decision metrics indicate a relative likelihood that the detected soft decision codeword is a correct estimate of the transmitted codeword. A lower soft decision metric for a given soft decision indicates that the estimated soft decision codeword is less likely to be a correct decision estimate of the transmitted codeword and is less likely to contain the transmitted message.

The codeword soft decision processor 304 associated with a symbol level decoding of one embodiment determines a soft decision metric, which is indicated as $M_1$, for a first candidate block encoded codeword that is a most likely estimate according to the following equation:

$$M_1 = \max\left[-\sum_i (|r_i|^2 + |H_i S_i|^2 - 2\text{Re}(r_i^* H_i S_i))\right]$$

Where:

The summation is carried over one block codeword;

$r_i$ represents the $i^{th}$ received channel symbol;

$S_i$ represents the $i^{th}$ transmitted channel symbol for a candidate block encoded codeword; and $H_i$ represents an air interface channel coefficient associated with $r_i$.

(*) represents conjugate transpose operation

The summation according to the above equation with the maximum value, based upon a set of possible transmit channel symbols $S_i$ as determined by valid block encoded transmitted channel symbol patterns for candidate block encoded codewords, represents the most likely estimate of a transmitted codeword. Each possible codeword has a corresponding soft decision metric for a given received codeword $r_i$. Similar processing is used to determine a next maximum value of the above summation in order to determine a second candidate block encoded codeword that corresponds to a second most likely decoded data element represented by a different set of $S_i$. The soft decision metric for the second most likely codeword estimate is represented as $M_2$.

As described above, the codeword soft decision processor 304 of this embodiment of the present invention determines soft decision metrics for the most likely soft decision codeword and also for the next, or second, most likely soft decision codeword. One embodiment of the present invention uses the difference of these two soft decision metrics to base a confidence indicator for the estimated received codeword produced as an output of the symbol level decoder. This difference is then adjusted by a channel dependent term, such as the average power of received symbols associated with one codeword. In the case of embodiments that incorporate bit level soft decision processing within their codeword decoder 208, a similar processing is performed to determine the difference between the highest and the second highest soft decisions. This difference is then adjusted by the average power of received soft bits associated with one codeword.

The codeword soft decision processor 304 produces a detected codeword, which corresponds to the most likely codeword estimate based upon the soft decision processing of this embodiment. The detected codeword is provided to the data out interface 306, which provides the data output 210. The codeword soft decision processor 304 further produces a highest soft decision metric 324, which corresponds to the soft decision metric for the most likely codeword estimate of the received feedback channel codeword, as represented by $M_1$. The codeword soft decision processor 304 further produces a next highest soft decision metric 326, which corresponds to the soft decision metric for the second most likely estimate of the received feedback channel codeword. The next highest soft decision metric 326 is represented by $M_2$ in this discussion.

The codeword soft decision processor 304 further includes a confidence indicator calculator 308. The confidence indicator calculator 308 accepts the highest soft decision metric 324 and the next highest soft decision metric 326 along with the signal 320. The confidence indicator calculator 308 determines a confidence indicator value based upon these inputs according to the following equations:

$$D = \frac{(M_1 - M_2)}{\sqrt{\frac{1}{N}\sum_i |r_i|^2}}$$

$$C = \alpha \frac{(M_1 - M_2)}{\sqrt{\frac{1}{N}\sum_i |r_i|^2}} = \alpha D$$

Where: N is the number of received soft symbols or soft bits for symbol level or bit level decoder, respectively; The summation is carried over the whole received soft symbols or soft bits in a code block; and a channel correction factor "$\alpha$" is selected based upon the magnitude of the above defined value of D.

The confidence indicator value determined by the above equation is determined by calculating a difference between a first soft decision metric $M_1$, which corresponds to the highest soft decision metric 324, and a second soft decision metric $M_2$, which corresponds to the next highest soft decision metric 326. This difference is then normalized based upon the average power of the received undetected signal by dividing that difference by the square root of the mean of the squared magnitudes of either the received undetected channel symbols for the codeword, in the case of using symbol level soft decision processor, or for the soft decision bits for the codeword in the case of using bit level soft decisions. In this context, a calculated "mean" corresponds to the summation of elements that are weighted by their corresponding probability. In this particular example, the probability of each element is equal and therefore is weighted by the inverse of the number of elements, i.e., by 1/N where N is the number of total elements. This normalized difference is then scaled by a channel dependent factor represented as "$\alpha$" in the above equation.

The channel correction factor "$\alpha$" in one embodiment of the present invention is selected based upon the determined magnitude of the value of "D" as defined by the above equation. A threshold table 330 of one embodiment stores one or more thresholds to which calculated values of "D" are compared. An "$\alpha$" table 332 stores values of "$\alpha$" to be used based upon the relationship of the calculated value of "D" to the one or more thresholds stored in the threshold table 330. Based upon the relationship of the calculated value of "D" to the one or more stored threshold values stored in the threshold table 330, a corresponding "$\alpha$" value is retrieved from the "$\alpha$" table 332. As an example of thresholds used in one embodiment of the present invention and the corresponding values of "$\alpha$" that are used to calculate the above defined value for "C" is given below:

$\alpha=1$ if $D \leq T1$ $\alpha=0.9$ if $T1 \leq D \leq T2$ $\alpha=0.19$ if $T2 \leq D$ $T1=10, T2=13.5$ In the above example, it is to be noted that all of the example values represented for D, T1, T2 and $\alpha$ are for embodiments incorporating bit level soft decision processing to process a WiMax Enhanced Fast Feedback (EFF) channel. These values should be changed accordingly when processing other WiMax feedback channels, other types of data, or for embodiments that incorporate symbol level soft decision decoders.

The confidence indicator calculator 308 provides the confidence indicator value 328, as calculated for "C" by the above equation, to a confidence indicator filter 310. The confidence indicator filter 310 performs time filtering of the calculated confidence indicator value 328 in order to mitigate statistics variations among the individual confidence indicators. The confidence indicator filter 310 produces a filtered confidence indicator output $y_k$ for a corresponding codeword indexed by "k." The current filtered decoded data element confidence indicator output $y_k$ is based upon the last filtered confidence indicator output $y_{k-1}$, the currently decoded data element confidence indicator $C_k$, and a filter coefficient $\lambda$. The filter coefficient $\lambda$ of one embodiment of the present invention is stored in a filter coefficient storage 334. The current filtered confidence indicator output $y_k$ is calculated in one embodiment of the present invention according to the following equation:

$$y_k = (1-\lambda)y_{k-1} + \lambda C_k$$

Where: $\lambda$ is a pre-defined filter coefficient. In one embodiment, the value of $\lambda$ is selected to be 0.9.

Figure 4:
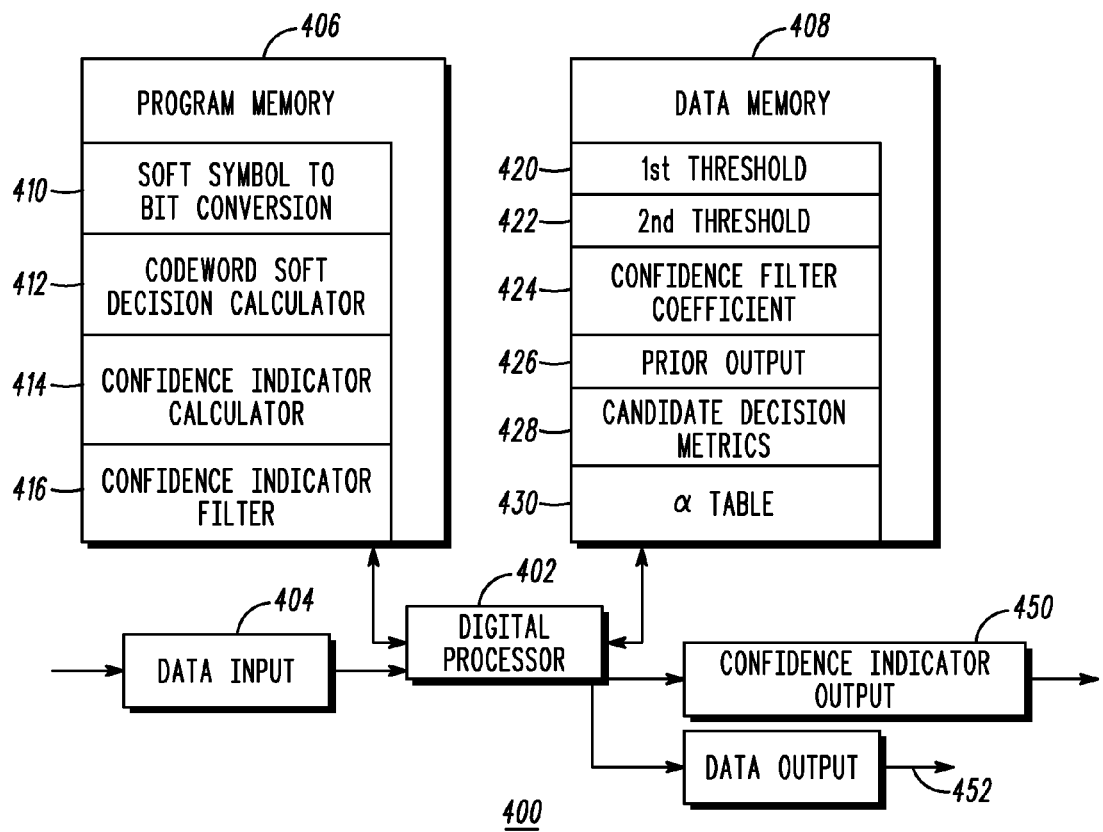
FIG. 4 illustrates a block diagram of a programmable signal processor as included in the transceiver of FIG. 1, in accordance with one embodiment of the present invention.

FIG. 4 illustrates a block diagram of a programmable signal processor 400 as is included in the transceiver 100 of FIG. 1, in accordance with one embodiment of the present invention. The programmable signal processor 400 in this example performs as an alternative implementation of a codeword decoder 208. The programmable signal processor 400 accepts an equalized signal input and provides feedback channel data output 210 and a confidence indicator output 212.

The programmable signal processor 400 includes a digital processor 402 that performs the programmed processing defined by software programs, as is described below. The digital processor 402 of some embodiments of the present invention are able to include programmable microprocessors, pre-configured or reconfigurable gate arrays, and/or any other suitable signal processing hardware capable of being configured or re-configured to perform pre-programmed or re-programmable tasks. The digital processor 402 accepts equalized and digitized data produced by the data input 404. The digital processor 402 produces feedback channel data through a data output 452 and feedback channel data through the confidence indicator output 450.

The programmable signal processor 400 includes a program memory 406 that stores programs that define the processing defined for the digital processor 402. The program memory 406 of one embodiment of the present invention includes a soft symbol to bit conversion processor program 410 that translates received soft symbols into soft data bit decisions similar to that described above for the soft symbol to bit conversion 302 described above. The program memory 406 includes a codeword soft decision calculator program 412 that defines processing to determine soft decision and associated soft decision metrics in a manner similar to that described above for the codeword soft decision processor 304. The program memory 406 includes a confidence indicator calculator program that defines processing to determine confidence indicators for soft detected codewords in a manner similar to that described above for the confidence indicator calculator 308. The program memory 406 further includes a confidence indicator filter program 416 that defines processing to time filter the determined confidence indicators in a manner similar to that described above for the confidence indicator filter 310.

The programmable signal processor 400 includes a data memory 408. Data memory 408 stores data that support processing performed by digital processor 402. Data memory 408 of one embodiment of the present invention includes a first threshold 420 and a second threshold 422. The first threshold 420 and the second threshold of this embodiment are analogous to the thresholds stored in the threshold storage 330 described above. The data memory 408 also stores a confidence filter coefficient 424 that corresponds to the value of $\lambda$ described above and is analogous to the value stored in the filter coefficient storage 334. The data memory 408 stores a prior confidence output 426, which corresponds to the value of $y_{k-1}$ described above, that is used for coefficient filtering processing similar to that described above. Data memory 408 also stores candidate decision metrics 428, which includes the most likely soft decision metric $M_1$ and the next most likely soft decision metric $M_2$. Data memory 408 further stores an "$\alpha$" table 430 that stores values of "$\alpha$" to be used based upon the calculated value of "D" as is described above. The data memory 408 of some embodiments of the present invention further stores other data, in a volatile or non-volatile state, to support operation of those embodiments.

Figure 5:
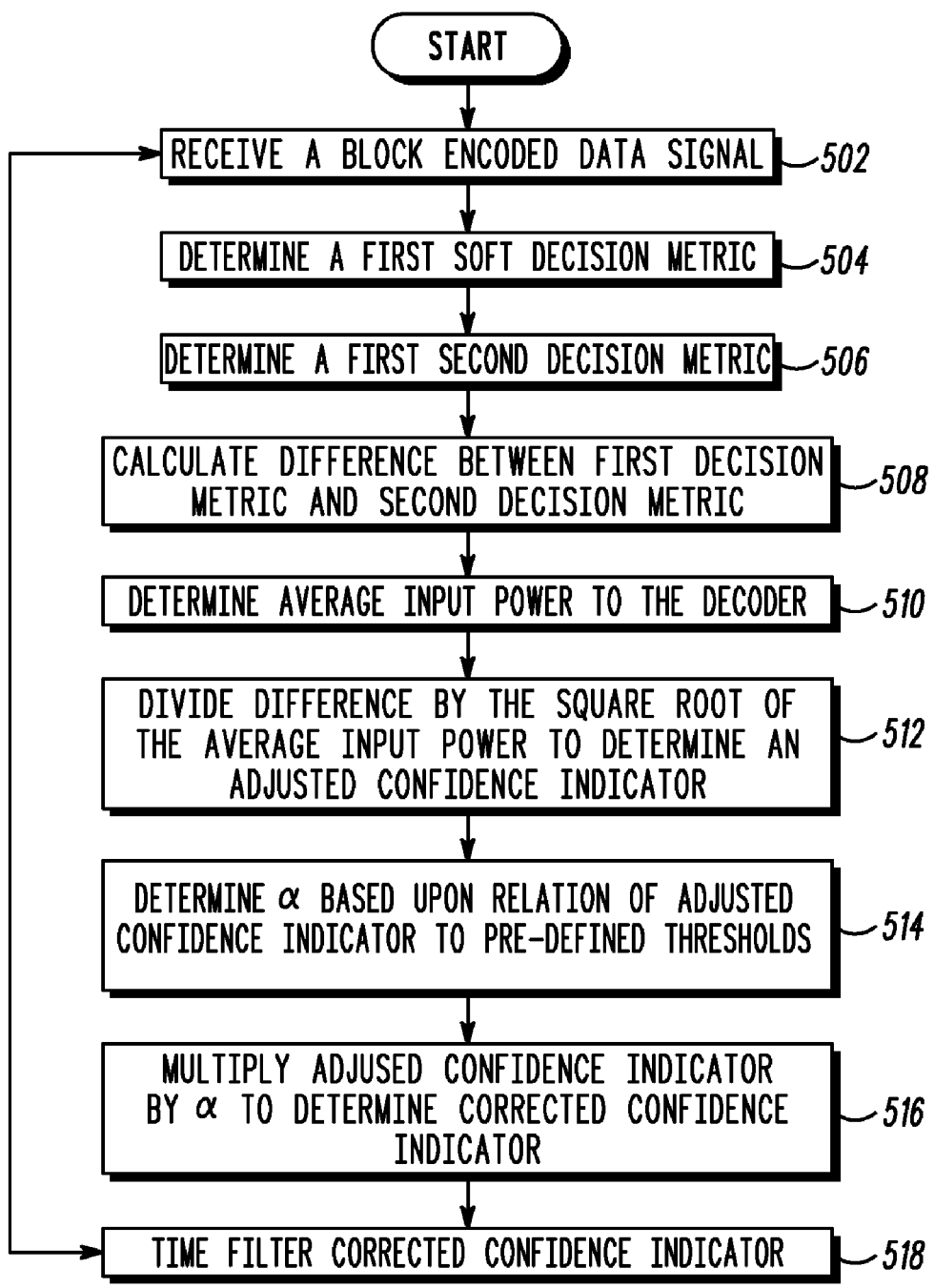
FIG. 5 illustrates a processing flow diagram for a detected data confidence indicator determination process, in accordance with an exemplary embodiment of the present invention.

FIG. 5 illustrates a processing flow diagram for a detected data confidence indicator determination processing 500, in accordance with an exemplary embodiment of the present invention. The detected data confidence indicator determination processing 500 produces a confidence indicator based upon soft decision metrics for data detected through soft decision processing. The detected data confidence indicator determination processing 500 begins by receiving, at step 502, a block encoded data signal. The block encoded data signal contains representations of channel symbols or soft bits received by a receiver performing the received block encoded signal processing 500. The processing continues by determining, at step 504, a first soft decision metric and by determining, at step 506, a second soft decision metric for a received signal being processed. These two soft decision metrics are performed in the course of determining soft decision detected data for the received block encoded data signal and correspond to soft decision metrics of the most likely and next most likely codeword decision.

The detected data confidence indicator determination processing 500 continues by calculating, at step 508, a difference between the first decision metric and the second decision metric. The detected data confidence indicator determination processing 500 continues by determining, at step 510, an average signal power value being received by the decoder. The average power value in this context is a value that is proportional to the average of the squared received signal magnitude. In one embodiment of the present invention, the correction value is the square root of the mean of the squared magnitudes of all channel symbols, in the case of symbol level soft decision processing, or of all soft bits, in the case of bit level soft decision processing, that are received for one codeword being processed.

The detected data confidence indicator determination processing 500 continues by dividing, at step 512, the difference of the first soft decision metric and the second soft decision metric by the square root of the average input power to determine an adjusted confidence indicator. Dividing the difference by that value normalizes the difference based upon a power of the received undetected signal and produces a normalized difference. The processing then determines, at step 514, a value of "$\alpha$" based upon a relation of the adjusted confidence indicator to pre-defined thresholds, as is described above.

The processing next multiplies, at step 516, the adjusted confidence indicator by "α" to determine a corrected confidence indicator. The processing next time filters, at step 518, the corrected confidence indictor to provide a filtered confidence indicator as an output. In one embodiment, the filtered confidence indicator is provided along with the soft decision to further processing, such as to a wireless network controller. The processing then returns to receiving, at step 502, another block encoded data signal.

The present invention may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for processing a received signal, the method comprising:

determining a first soft decision metric associated with a most likely decoded data element based upon a received undetected signal comprising a plurality of channel data symbols conveying a block encoded data message, wherein the first soft decision metric is determined based upon a first set of soft data bit decision metrics determined for at least one data bit conveyed by the plurality of channel symbols, the first set of soft data bit decision metrics comprising soft data bit decisions for at least one most likely detected data bit decision for each of the at least one data bit;

determining a second soft decision metric associated with a next most likely decoded data element based upon the received undetected signal, wherein the second soft decision metric is determined based upon a second set of soft data bit decision metrics determined for the at least one data bit conveyed by the plurality of channel symbols, the second set of soft data bit decision metrics comprising soft data bit decisions for at least one next most likely bit decision for each of the at least one data;

calculating a difference between the first soft decision metric and the second soft decision metric;

normalizing the difference based upon a power of the received undetected signal to produce a normalized difference; and scaling the normalized difference by a communications channel dependent factor to produce a decoded data element confidence indicator.

2. The method of claim 1, wherein the first soft decision metric and the second soft decision metric are determined based upon a determined distance between the received undetected signal and a first candidate block encoded codeword corresponding to the most likely decoded data element and a second candidate block encoded codeword corresponding to the next most likely decoded data element, respectively.

3. The method of claim 1, wherein the communications channel dependent factor is selected based upon a value of the normalized difference.

4. The method of claim 1, further comprising determining the communications channel dependent factor, the determining the communications channel dependent factor comprising:

determining a mean of squared magnitudes for the received undetected signal, the mean of squared magnitudes comprising a sum of at least some of a plurality of channel data symbols contained within the received undetected signal that are weighted by their probability; and determining a square root of the mean of squared signal magnitudes, and wherein the normalizing comprises dividing the difference by the square root of the mean of squared magnitudes to produce the normalized difference.

5. The method of claim 4, wherein the determining the communications channel dependent factor further comprises:

determining that the normalized difference is greater than at least one pre-determined threshold;

setting, in response to determining the normalized difference is greater than one of the at least one pre-determined threshold, the communications channel dependent factor to a first pre-determined communications channel dependent factor; and setting, in response to determining that the normalized difference is less than the one of the at least one pre-determined threshold, the communications channel dependent factor to a second pre-determined communications channel dependent factor.

6. The method of claim 1, further comprising low pass filtering the decoded data element confidence indicator.

7. The method of claim 6, wherein the low pass filtering comprises:
multiplying a current decoded data element confidence indicator by a filtering coefficient with a magnitude less than one to produce a first product;
multiplying a last filtered decoded data element confidence indicator by one minus the filtering coefficient to produce a second product; and
producing a current filtered confidence indicator by adding the first product and the second product.

8. A wireless communications digital data receiver, comprising:
a soft decision processor adapted to determine a first soft decision metric associated with a most likely decoded data element based upon a received undetected signal comprising a plurality of channel data symbols conveying a block encoded data message, wherein the first soft decision metric is determined based upon a first set of soft data bit decision metrics determined for at least one data bit conveyed by the plurality of channel symbols, the first set of soft data bit decision metrics comprising soft data bit decisions for at least one most likely detected data bit decision for each of the at least one data bit, and to determine a second soft decision metric associated with a next most likely decoded data element based upon the received undetected signal, wherein the second soft decision metric is determined based upon a second set of soft data bit decision metrics determined for the at least one data bit conveyed by the plurality of channel symbols, the second set of soft data bit decision metrics comprising soft data bit decisions for at least one next most likely bit decision for each of the at least one data;
a confidence indicator calculator adapted to:
calculate a difference between the first soft decision metric and the second soft decision metric,
normalize the difference based upon a power of the received undetected signal to produce a normalized difference, and
scale the normalized difference by a communications channel dependent factor to produce a scaled normalized difference; and
a confidence indicator output adapted to produce the decoded data element confidence indicator.

9. The wireless communications digital data receiver of claim 8, further comprising a confidence indicator filter adapted to low pass filter the decoded data element confidence indicator by:
multiplying a current decoded data element confidence indicator by a filtering coefficient with a magnitude less than one to produce a first product;
multiplying a last filtered confidence indicator by one minus the filtering coefficient to produce a second product; and
producing a current filtered decoded data element confidence indicator by adding the first product and the second product.

10. The wireless communications digital data receiver of claim 8, wherein the first soft decision metric and the second soft decision metrics are determined based upon a determined distance between the received undetected signal and a first candidate block encoded codeword corresponding to the most likely decoded data element and a second candidate block encoded codeword corresponding to the next most likely decoded data element, respectively.

11. The wireless communications digital data receiver of claim 8, wherein the confidence indicator calculator is further adapted to scale the decoded data element confidence indicator by a communications channel dependent factor that is based upon a value of the normalized difference.

12. The wireless communications digital data receiver of claim 11, wherein the confidence indicator calculator is further adapted to determine the communications channel dependent factor by:
determining a mean of squared magnitudes for the received undetected signal, the mean of squared magnitudes comprising a sum of at least some of a plurality of channel data symbols contained within the received undetected signal that are weighted by their probability; and
determining a square root of the mean of squared signal magnitudes, and
wherein the confidence indicator calculator is further adapted to normalize the difference by dividing the difference by the square root of the mean of squared magnitudes to produce the normalized difference.

13. The wireless communications digital data receiver of claim 12, wherein confidence indicator calculator is further adapted to determine the communications channel dependent factor by:
determining that the normalized difference is greater than at least one pre-determined threshold;
setting, in response to determining the normalized difference is greater than one of the at least one pre-determined threshold, the communications channel dependent factor to a first pre-determined communications channel dependent factor; and
setting, in response to determining that the normalized difference is not greater than the one of the at least one pre-determined threshold, the communications channel dependent factor to a second pre-determined communications channel dependent factor.

14. A base station receiver, comprising:
a soft decision processor adapted to determine a first soft decision metric associated with a most likely decoded data element based upon a received undetected signal comprising a plurality of channel data symbols conveying a block encoded data message, wherein the first soft decision metric is determined based upon a first set of soft data bit decision metrics determined for at least one data bit conveyed by the plurality of channel symbols, the first set of soft data bit decision metrics comprising soft data bit decisions for at least one most likely detected data bit decision for each of the at least one data bit, and to determine a second soft decision metric associated with a next most likely decoded data element based upon the received undetected signal, wherein the second soft decision metric is determined based upon a second set of soft data bit decision metrics determined for the at least one data bit conveyed by the plurality of channel symbols, the second set of soft data bit decision metrics comprising soft data bit decisions for at least one next most likely bit decision for each of the at least one data;
a confidence indicator calculator adapted to:
calculate a difference between the first soft decision metric and the second soft decision metric,
normalize the difference based upon a power of the received undetected signal to produce a normalized difference, and scale the normalized difference by a communications channel dependent factor to produce a decoded data element confidence indicator; and a confidence indicator output adapted to produce the decoded data element confidence indicator.

15. The base station receiver of claim 14, wherein the confidence indicator calculator is further adapted to scale the decoded data element confidence indicator by a communications channel dependent factor that is based upon a value of the normalized difference.

16. The base station receiver of claim 14, further comprising a confidence indicator filter adapted to low pass filter the decoded data element confidence indicator.

* * * * *